(12) United States Patent
Stallard

(10) Patent No.: US 8,515,749 B2
(45) Date of Patent: Aug. 20, 2013

(54) SPEECH-TO-SPEECH TRANSLATION

(75) Inventor: David G. Stallard, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 393 days.

(21) Appl. No.: 12/469,156

(22) Filed: May 20, 2009

(65) Prior Publication Data

US 2010/0299147 A1 Nov. 25, 2010

(51) Int. Cl.
*G10L 15/26* (2006.01)

(52) U.S. Cl.
USPC ............ 704/235; 704/7; 704/3; 704/277; 704/275; 704/260; 704/258; 704/254; 704/233; 704/2; 704/10; 700/83; 455/466; 379/88.06; 379/114.01; 715/234; 709/217; 709/203

(58) Field of Classification Search
USPC ............ 704/235, 3, 277, 275, 260, 258, 254, 704/233, 2, 10, 7; 709/217, 203; 707/102; 715/234; 700/83; 455/466; 379/88.06, 114.01
See application file for complete search history.

(56) References Cited

U.S. PATENT DOCUMENTS

| | | | |
|---|---|---|---|
| 5,384,701 A | | 1/1995 | Stentiford et al. |
| 5,548,681 A | * | 8/1996 | Gleaves et al. ............ 704/233 |
| 6,067,521 A | * | 5/2000 | Ishii et al. ............... 704/275 |
| 6,339,754 B1 | | 1/2002 | Flanagan et al. |
| 6,385,586 B1 | | 5/2002 | Dietz |
| 6,917,920 B1 | | 7/2005 | Koizumi et al. |
| 6,996,520 B2 | * | 2/2006 | Levin ......................... 704/10 |
| 7,085,817 B1 | * | 8/2006 | Tock et al. ................ 709/217 |
| 7,200,555 B1 | * | 4/2007 | Ballard et al. ............. 704/235 |
| 7,395,204 B2 | | 7/2008 | VanderBaan et al. |
| 7,461,001 B2 | | 12/2008 | Liqin et al. |
| 2002/0099456 A1 | * | 7/2002 | McLean ...................... 700/83 |
| 2003/0187650 A1 | * | 10/2003 | Moore et al. ............. 704/260 |
| 2003/0208352 A1 | * | 11/2003 | Lee ............................ 704/2 |
| 2004/0102201 A1 | * | 5/2004 | Levin ...................... 455/466 |
| 2004/0102956 A1 | * | 5/2004 | Levin ......................... 704/2 |
| 2004/0267527 A1 | * | 12/2004 | Creamer et al. ........... 704/235 |
| 2005/0074101 A1 | * | 4/2005 | Moore et al. .......... 379/114.01 |
| 2005/0086051 A1 | * | 4/2005 | Brulle-Drews ............. 704/7 |
| 2006/0074672 A1 | * | 4/2006 | Allefs ..................... 704/258 |
| 2006/0133585 A1 | * | 6/2006 | Daigle et al. ........... 379/88.06 |
| 2006/0136226 A1 | * | 6/2006 | Emam ..................... 704/277 |
| 2006/0143308 A1 | * | 6/2006 | Cazzolla et al. .......... 709/248 |
| 2006/0293893 A1 | | 12/2006 | Horvitz |
| 2007/0174326 A1 | * | 7/2007 | Schwartz et al. .......... 707/102 |
| 2007/0203701 A1 | * | 8/2007 | Ruwisch ................. 704/254 |
| 2008/0077387 A1 | * | 3/2008 | Ariu ............................ 704/3 |
| 2008/0195386 A1 | * | 8/2008 | Proidl et al. ............. 704/235 |
| 2009/0158137 A1 | * | 6/2009 | Ittycheriah et al. ........ 715/234 |
| 2009/0234651 A1 | * | 9/2009 | Basir et al. .............. 704/254 |

\* cited by examiner

*Primary Examiner* — Michael Colucci

(74) *Attorney, Agent, or Firm* — Occhiuti Roblicek & Tsao LLP

(57) ABSTRACT

Systems and methods for facilitating communication including recognizing speech in a first language represented in a first audio signal; forming a first text representation of the speech; processing the first text representation to form data representing a second audio signal; and causing presentation of the second audio signal to a second user while responsive to an interrupt signal from a first user. In some embodiments, processing the first text representation includes translating the first text representation to a second text representation in a second language and processing the second text representation to form the data representing the second audio signal. In some embodiments include accepting an interrupt signal from the first user and interrupting the presentation of the second audio signal.

17 Claims, 2 Drawing Sheets

SPEECH-TO-SPEECH TRANSLATION

STATEMENT AS TO FEDERALLY-SPONSORED RESEARCH

This invention was made with government support under contract NBCHC030014 awarded by the National Business Center (NBC) of the Department of Interior (DOI) and sponsored by the Defence Advanced Research Projects Agency (DARPA) Information Processing Techniques Office (IPTO). The government has certain rights in the invention.

BACKGROUND

This description relates to speech-to-speech translation.

Speech to speech translation systems generally cascade (1) speech recognition in the source language, (2) language translation, and (3) text to speech in target language. It is desirable to catch speech recognition errors before they propagate through the translation and text-to-speech steps. It is also desirable to reduce delay between the utterance in the source language and presentation in the target language.

SUMMARY

Communication is facilitated by speech-to-speech translation performed in parallel with confirmation of recognized speech. Concurrent processing of recognized speech may be interrupted or aborted based on a rejection or non-confirmation of the recognized speech.

In one aspect, in general, a method for speech-based communication includes accepting data representing a first audio signal and recognizing speech represented in the first audio signal to form a first text representation of the speech. The speech is spoken by a first user in a first language. The method also includes processing the first text representation to form data representing a second audio signal and causing presentation of the second audio signal to a second user while responsive to an interrupt signal from the first user.

Aspects can include one or more of the following.

Processing the first text representation may include translating the first text representation to a second text representation in a second language, and processing the second text representation to form the data representing the second audio signal. The second language may be an alternate dialect of the first language. Processing the first text representation may include translating the first text representation to a symbolic representation.

In some embodiments, the method for speech-based communication further includes accepting an interrupt signal from the first user and interrupting the presentation of the second audio signal.

In some embodiments, the method for speech-based communication further includes soliciting verification from the first user concurrently with processing the first text representation to form data representing a second audio signal and presentation of the second audio signal. The first text representation may be presented (e.g., audibly) to the first user.

In another aspect, in general, a system includes an audio input device, a speech to text module configured to recognize speech in a first language received at the audio input device and generate a text representation of the recognized speech, a user assessment module including a user feedback mechanism configured to accept an assessment from a first user and further including a signaling mechanism configured to send an interrupt signal contingent on the assessment, a translation module responsive to the interrupt signal configured to translate the text representation to a translation in a second language, a speech synthesis module responsive to the interrupt signal configured to synthesize an audio signal from the translation, and an audio output device responsive to the interrupt signal configured to audibly output the audio signal.

Aspects can include one or more of the following.

The system may further include a display configured to present the text representation of the recognized speech to the first user. The system may further include an audio return module configured to present the text representation of the recognized speech to the first user as synthesized speech. The audio return module may use the speech synthesis module to generate the synthesized speech. The system may further include a connection port for connecting to an auxiliary audio-output device. The system may further include an indicator having a state related to the assessment from the first user. The audio output device may terminate audio output in response to the interrupt signal. The audio output device may receive the audio signal via radio transmission. The system may further include an input mechanism for controlling language selection (e.g., swapping the first language with the second language). The input mechanism for controlling language selection may be a toggle switch.

Other features and advantages of the invention are apparent from the following description, and from the claims.

DESCRIPTION

Speech-to-speech translation systems generally enable a user to speak a first language and communicate with an audience who does not understand the first language. Translation systems as in FIG. 1 allow the user to verify that the translation system correctly understood the user's spoken input while the system waits for verification before providing a translated output to the audience. The description below includes one ore more methods and systems for speech-to-speech translation with input verification in parallel with translation and output synthesis.

Figure 1:
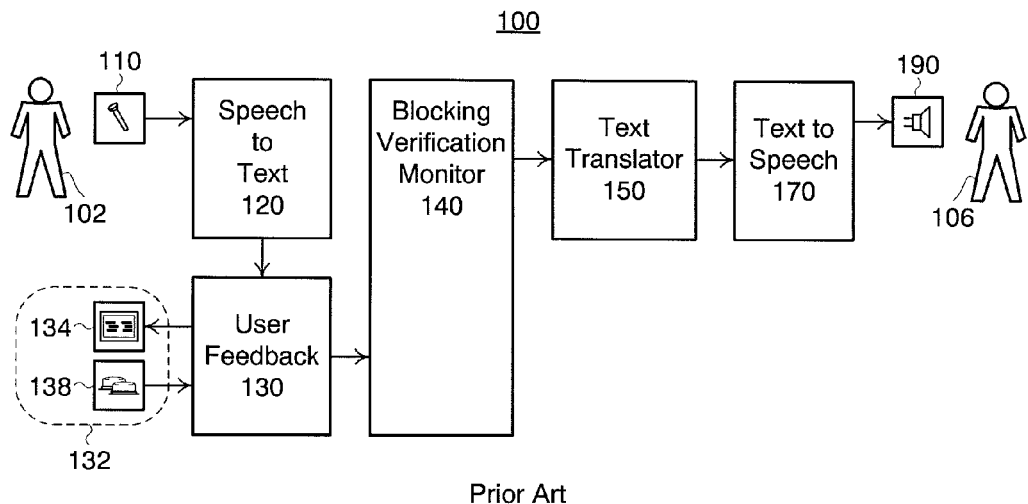
FIG. 1 is a system block diagram of the prior art.

Referring to FIG. 1, in one example of a speech-to-speech translation system 100, a user 102 speaks a first language and communicates in a different language with an audience of one or more people 106 who do not understand the first language. The translation system 100 enables communication by using a speech-to-text system 120 to recognize spoken input from the user 102 via a microphone 110, a text translator 150 to translate the recognized text from the first language to a second language, and a text-to-speech system 170 to synthesize output in the second language for the audience 106 via a speaker 190.

The example speech-to-speech translation system 100 requires that the user 102 affirm or reject recognition of each spoken statement prior to translation. A blocking verification monitor 140 waits for affirmation from a user feedback system 130 before allowing the system 100 to continue with translation and speech synthesis. The user feedback system 130 interacts with the user 102 via an interface 132. The interface 132 includes a screen 134 and control buttons 138. After the speech-to-text system 120 recognizes a statement and generates a text representation of the statement, the user feedback system 130 presents the text representation to the user 102 via the screen 134. The user affirms or rejects the text representation using the control buttons 138. The audience 106 does not hear synthesized output from the speaker 190 until after the user 102 affirms that the text representation is accurate.

Figure 2:
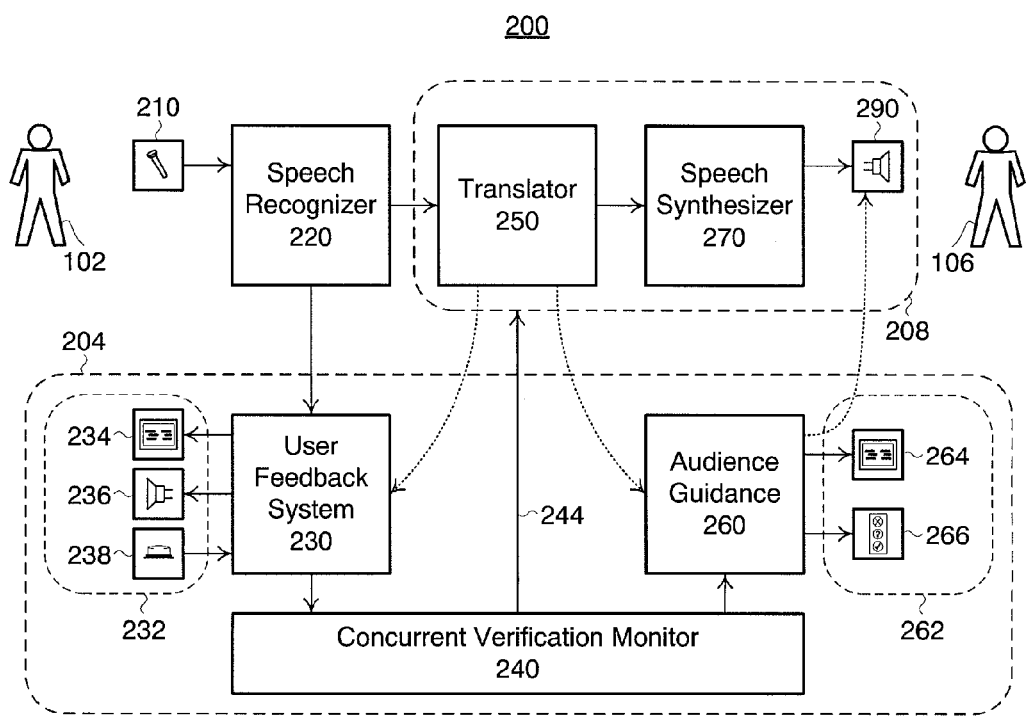
FIG. 2 is a system block diagram.

Referring to FIG. 2, in another example of a speech-to-speech translation system 200, the user 102 again speaks a first language and communicates in a different language with the audience 106. The translation system 200 also enables communication by using a speech recognizer 220 to recognize spoken input from the user 102 via a microphone 210, a translator 250 to translate the recognized speech from the first language to the second language, and a speech synthesizer 270 to synthesize output in the second language via a speaker 290. Generally, the speech recognizer 220 is a speech-to-text system, the translator 250 is a text translator, and the speech synthesizer 270 is a text-to-speech system, although in some embodiments, internal representations other than text are used.

Figure 3:
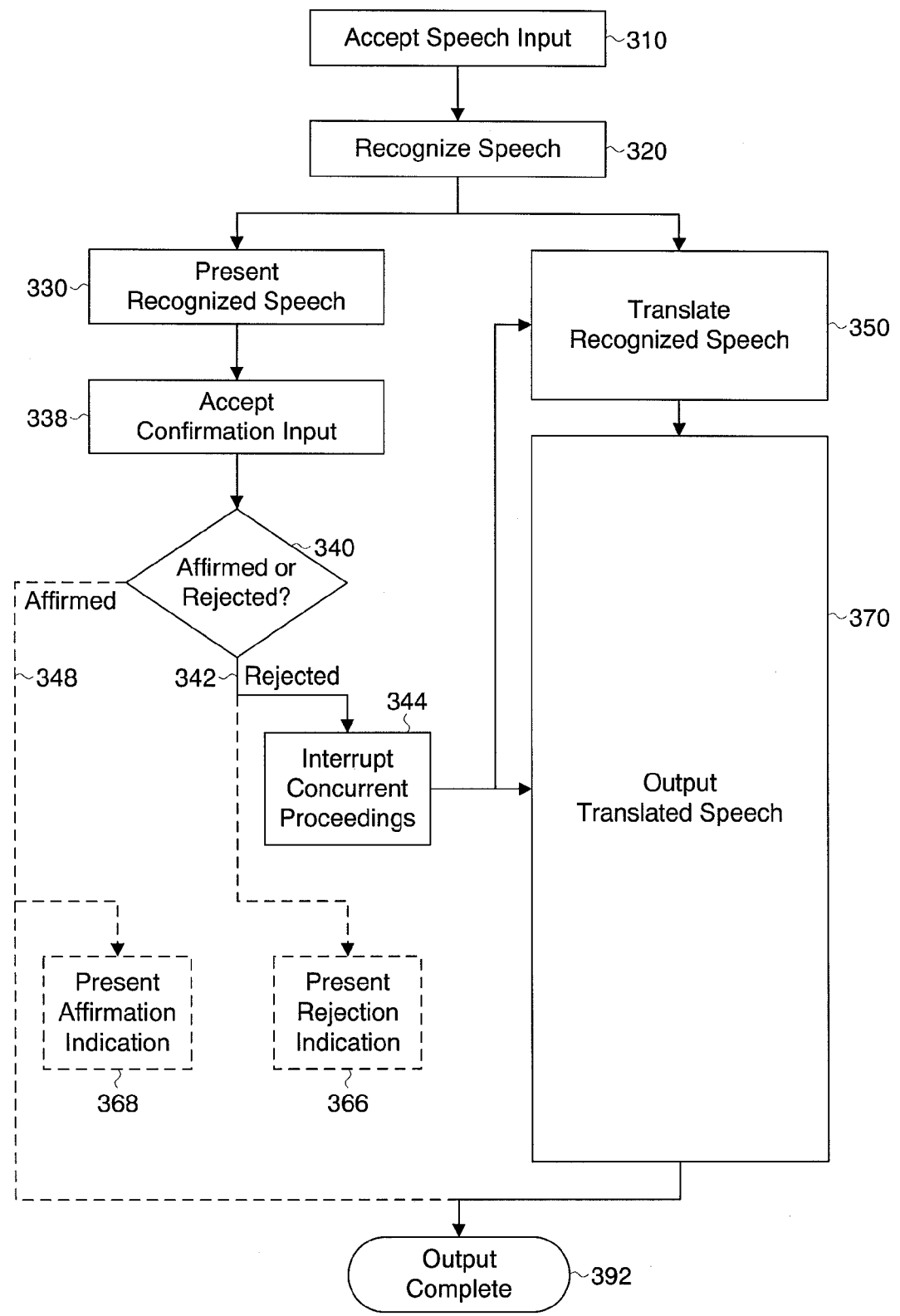
FIG. 3 is a flow chart.

The speech-to-speech translation system 200 allows the user 102 to confirm the accuracy of the speech recognizer 220 while the translation system 200 concurrently proceeds with translation and synthesis 208. Elements of participant feedback 204 operate in parallel with the elements of translation and synthesis 208. Translation and synthesis 208 do not block or wait for affirmation from the user 102. In some embodiments, in the event that the user 102 rejects the recognized speech, translation and synthesis 208 are terminated or aborted. Flow is illustrated in FIG. 3 and discussed in more detail below.

Continuing to refer to FIG. 2, after the speech recognizer 220 recognizes input spoken at the microphone 210, the recognized input is passed both to the translator 250 and to a user feedback system 230. The user feedback system 230 presents the recognized input back to the user 102 via a user interface 232. For example, the feedback system 230 presents the recognized input as text on a display 234. Alternatively, or additionally, the feedback system 230 synthesizes speech from the recognized input and sends an audio signal to a speaker or headphone 236 for the user 102. In some embodiments, the display 234 is also used by the feedback system 230 to present a text version of the translation (from the translator 250). The user 102 may reject the recognized input presented, affirm the recognized input as accurate, or ignore the presentation (i.e., passively affirm). For example, the user is presented with a single reject button 238 for entering a rejection and the user simply does nothing to affirm. In some embodiments supporting active affirmation, an affirm button is also presented.

Affirmation or rejection input from the user 102 is passed from the user feedback system 230 to the concurrent verification monitor 240. In the event of a rejection, the monitor 240 generates an interrupt signal 244. In some embodiments, the monitor 240 also updates an audience guidance system 260 with the affirmation or rejection information.

Translation and synthesis 208 are responsive to the interrupt signal 244. In some embodiments, in response to the interrupt signal 244, translation and synthesis 208 are terminated or aborted. In some cases, by the time the user 102 rejects the recognized input, the speech synthesizer 270 will have already begun to generate an output signal and the audience 106 will have heard a portion of the incorrect output. In some embodiments, an audience guidance system 260 presents an explanatory message in the second language informing the audience 106 of the rejection, e.g., as an audible message played over the speaker 290.

In some embodiments, the audience guidance system 260 provides additional guidance to the audience 106 about what they are hearing from the speaker 290. The audience guidance system 260 accepts input from the concurrent verification monitor 240 regarding feedback from the user 102. The audience guidance system 260 presents guidance to the audience 106 via an audience interface 262, which generally includes the speaker 290.

In some embodiments, the audience interface 262 also includes a display 264 and/or one or more indicator lights 266. The audience guidance system 260 updates the display 264 and/or the lights 266 with status information regarding the translation. For example, the audience guidance system 260 indicates if the translation is based on unconfirmed recognition (e.g., by presenting a question mark, an orange light, or the phrase "input unconfirmed" translated in the second language), affirmed recognition (e.g., by presenting a check mark, a green light, or "input confirmed" translated in the second language), or rejected recognition (e.g., by presenting an X, a red light, or "input error" translated in the second language). In some embodiments, fewer indications are used, e.g., just an indication of rejected recognition. In some embodiments, the display 264 is also used by the audience guidance system 260 to present a text version of the translation (from the translator 250).

Referring to the flowchart of FIG. 3 with reference to the block diagram of FIG. 2, the speech-to-speech translation system 200 accepts speech input (310) and the speech recognizer 220 recognizes the speech input (320). The speech-to-speech translation system 200 then concurrently proceeds with two parallel processes. In one of the parallel processes, the translator 250 translates the recognized speech (350) and the speech synthesizer 270 generates output (through the speaker 290) of the translated speech (370). In the other parallel process, the user feedback system 230 presents the recognized speech back to the user 102 (330) and the user feedback system 230 accepts confirmation input (338) from the user 102. The verification monitor 240 processes the confirmation input (340) and, if the text is rejected (342), signals an interrupt 244 to the concurrent proceedings (344). In some embodiments, an audience guidance system 260 also presents a rejection indication to the audience (366). Generally, absent the interrupt (344), output of translated speech (370) flows to completion (392).

In some embodiments, the user feedback system 230 also accepts affirmative confirmation input (338). The verification monitor 240 processes the confirmation input (340) and, if the text is affirmed (348), allows output of translated speech (370) to flow to completion (392). In some embodiments, an audience guidance system 260 also presents an affirmation indication to the audience (368).

In some embodiments, the speech-to-speech system is embodied in a handheld device. The device includes controls, a display, a microphone, and a speaker. The user configures the device for the user's language preference and a language preference for the audience. In some examples, the device includes a control for alternating translation direction, enabling selective machine translation of the user alternated with machine translation of the audience for the user to hear. In some examples, the device includes one or more audio-output ports for connection to an auxiliary audio-output device. E.g., the device includes a headphone port for the user and/or a public-address port.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A computer-implemented method for speech-based communication comprising:
   accepting, via an audio input device, data representing a first audio signal;
   recognizing, using a speech to text module of the computer, speech represented in the first audio signal to form a first text representation of the speech, the speech spoken by a first user in a first language;
   processing, using a speech processing module, the first text representation to form data representing a second audio signal which represents a second text representation of the speech, the second text representation comprising a transformation of the first text representation;
   soliciting, via a user interface of the computer, verification from the first user including audibly presenting the first text representation to the first user concurrently with processing the first text representation to form the data representing the second audio signal; and
   causing presentation of the second audio signal via an audio output device to a second user while responsive to an interrupt signal from the first user received during the presentation of the second audio signal.

2. The computer-implemented method of claim 1, wherein processing the first text representation comprises
   translating, using a translation module of the computer, the first text representation to a second text representation in a second language, and
   processing, using a speech synthesis module of the computer, the second text representation to form the data representing the second audio signal.

3. The computer-implemented method of claim 2, wherein the second language is an alternate dialect of the first language.

4. The computer-implemented method of claim 1, further comprising accepting an interrupt signal from the first user and interrupting the presentation of the second audio signal.

5. The computer-implemented method of claim 1, wherein processing the first text representation comprises translating the first text representation to a symbolic representation.

6. The computer-implemented method of claim 1, wherein the interrupt signal from the first user is received during the presentation of the second audio signal.

7. A computer-based system comprising:
   an audio input device;
   a speech to text module of the computer configured to recognize speech from a first user in a first language received at the audio input device and generate a text representation of the recognized speech;
   an audio return module configured to present the text representation of the recognized speech to the first user as synthesized speech;

a user assessment module of the computer including a user feedback mechanism configured to accept an assessment from the first user and further including a signaling mechanism configured to send an interrupt signal contingent on the assessment;

a translation module of the computer responsive to the interrupt signal configured to translate the text representation to a translation in a second language;

a speech synthesis module of the computer responsive to the interrupt signal configured to synthesize an audio signal from the translation; and an audio output device of the computer responsive to the interrupt signal configured to audibly output the audio signal, wherein the user feedback mechanism is configured to accept the assessment from the first user concurrently with operation of at least one of the translation module and the speech synthesis module.

8. The computer-based system of claim 7, further comprising a display configured to present the text representation of the recognized speech to the first user.

9. The computer-based system of claim 7, wherein the audio return module uses the speech synthesis module to generate the synthesized speech.

10. The computer-based system of claim 7, further comprising a connection port for connecting to an auxiliary audio-output device.

11. The computer-based system of claim 7, further comprising an indicator having a state related to the assessment from the first user.

12. The computer-based system of claim 7, wherein the audio output device terminates audio output in response to the interrupt signal.

13. The computer-based system of claim 7, wherein the audio output device receives the audio signal via radio transmission.

14. The computer-based system of claim 7, further comprising an input mechanism for controlling language selection.

15. The computer-based system of claim 14, wherein controlling language selection comprises swapping the first language with the second language.

16. The computer-based system of claim 14, wherein the input mechanism for controlling language selection is a toggle switch.

17. A computer-implemented method for speech-based communication comprising:

accepting, via an audio input device, a first audio signal spoken by a first user in a first language;

recognizing, using a speech to text module of the computer, speech represented in the first audio signal to form a first text representation in the first language of the speech;

forming a second text representation in a second language as a translation of the first text representation;

processing, using a speech processing module, the second text representation to form data representing a second audio signal which represents the second text representation of the speech spoken in the second language;

processing, using the speech processing module, the first text representation to form data representing a third audio signal which represents the first text representation of the speech spoken in the first language;

concurrently (a) presenting at least part of a second audio signal via an audio output interface to a second user, (b) presenting at least part of the third audio signal , via an audio output device to the first user, and (c) accepting, via the audio input interface, a fourth audio signal from the first user; and causing interruption of the presenting of the second audio signal to the second user according to the fourth audio signal.

* * * * *